(12) United States Patent
Upah et al.

(10) Patent No.: US 10,723,389 B2
(45) Date of Patent: Jul. 28, 2020

(54) FRAME ASSEMBLY FOR A VEHICLE AND VEHICLE HAVING SAME

(71) Applicant: Honda Motor Co., Ltd., Tokyo (JP)

(72) Inventors: Luke M. Upah, Williamsburg, IA (US); Dakota D. Kirtland, Dublin, OH (US); Daniel T. Sellars, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 16/003,375

(22) Filed: Jun. 8, 2018

(65) Prior Publication Data
US 2019/0375463 A1 Dec. 12, 2019

(51) Int. Cl.
| | | |
|---|---|---|
| *B62D 25/10* | (2006.01) | |
| *B62D 21/02* | (2006.01) | |
| *B62D 25/08* | (2006.01) | |
| *B60Q 1/04* | (2006.01) | |

(52) U.S. Cl.
CPC ......... *B62D 25/088* (2013.01); *B60Q 1/0483* (2013.01); *B62D 21/02* (2013.01); *B62D 25/084* (2013.01); *B62D 25/10* (2013.01)

(58) Field of Classification Search
CPC .... B62D 25/088; B62D 25/084; B62D 25/10; B62D 21/02; B60Q 1/0483
See application file for complete search history.

(56) References Cited

U.S. PATENT DOCUMENTS

| | | | | |
|---|---|---|---|---|
| 2,936,842 | A  * | 5/1960 | Fallin | B62D 25/105 180/69.21 |
| 8,037,959 | B2 * | 10/2011 | Yamamura | B62D 25/084 180/68.4 |
| 8,205,910 | B2 | 6/2012 | Leonard et al. | |
| 8,672,396 | B2 | 3/2014 | Homan | |
| 9,102,205 | B2 | 8/2015 | Kvien et al. | |
| 9,186,952 | B2 | 11/2015 | Yleva | |
| 9,327,587 | B2 * | 5/2016 | Spindler | B62D 25/00 |
| 9,365,241 | B1 * | 6/2016 | Taracko | B62D 23/005 |
| 9,434,244 | B2 | 9/2016 | Sunsdahl et al. | |
| 10,189,428 | B1 * | 1/2019 | Sellars | B60R 19/34 |
| 2011/0073288 | A1 * | 3/2011 | Hirukawa | B60K 11/08 165/104.34 |
| 2013/0087397 | A1 * | 4/2013 | Yamamoto | B60G 3/20 180/68.4 |

(Continued)

OTHER PUBLICATIONS

"HTS1800 A New Era of Trike Design" http://www.trikeshop.com/hts1800/(Accessed Jul. 18, 2017).

*Primary Examiner* — Bryan A Evans
(74) *Attorney, Agent, or Firm* — Honda Patents & Technologies North America, LLC; Clifford B. Vaterlaus

(57) ABSTRACT

A front frame assembly for mounting a front suspension and wheel assembly of a vehicle can include a pair of longitudinally extending frame members, a pair of upwardly extending frame members, and a transverse bracket frame member extending transversely from and connected to each of the upwardly extending frame members. The transverse bracket can include mount structures for connecting to various vehicle components, such as a pair of dampers, a radiator, hood cushions, and a headlight assembly. The transverse bracket can be locate in an upper portion of the vehicle engine compartment, and extending above a top most position of the radiator.

20 Claims, 12 Drawing Sheets

(56) References Cited

U.S. PATENT DOCUMENTS

| | | | | |
|---|---|---|---|---|
| 2013/0175779 | A1* | 7/2013 | Kvien | B60G 3/20 |
| | | | | 280/124.15 |
| 2019/0211915 | A1* | 7/2019 | Davis | F16H 57/0416 |
| 2019/0225270 | A1* | 7/2019 | Upah | B60R 16/0207 |
| 2019/0375463 | A1* | 12/2019 | Upah | B62D 25/10 |

* cited by examiner

FRAME ASSEMBLY FOR A VEHICLE AND VEHICLE HAVING SAME

BACKGROUND

The disclosed subject matter relates to a vehicle and a frame assembly for the vehicle. More particularly, the disclosed subject matter relates to methods and apparatus related to an upper cushion bracket for connection to a vehicle frame and to various vehicle components. The vehicle frame can be configured to enhance load and energy management performance upon application of external loads and stresses, such as may occur during off-road travel over uneven terrain.

Vehicles, such as but not limited to all-terrain vehicles, can be subjected to relatively large load and/or energy inputs to the frame assembly due to the unevenness of the terrain across which the vehicle is travelling. The all-terrain vehicle can include a generally rigid frame assembly that is designed to withstand the load and energy inputs transmitted from the wheels and through the suspension components during travel over the uneven terrain. For example, space constraints and off-road durability may make it beneficial to provide very stiff portions of the vehicle frame that are spaced from the passenger area, such as but not limited to frame structures around the front suspension components, rear suspension components and/or powertrain components.

SUMMARY

In view of the problems and challenges existing in the related art vehicle frames, the presently disclosed subject matter includes a single part, such as a cushion bracket, that combines the mounting locations of several parts on one stamping. The cushion bracket can tie the right and left sides of the vehicle frame together while mounting the cushions, the radiator, and the headlight/fender stays.

Another aspect of the disclosed subject matter includes combining the right and left cushion mounts to efficiently transfer load across the frame body. This unique configuration for the cushion bracket enables mounting of other parts to this bracket including the radiator and the front fender/headlight stays.

Some embodiments are directed to a front frame assembly of a vehicle. The front frame assembly can include a cushion bracket.

According to one aspect of the disclosed subject matter, some embodiments are directed to a front frame assembly of a vehicle, that can include a pair of lower frame members extending in a longitudinal direction of the vehicle and spaced apart from each other in a transverse direction of the vehicle, each of the lower frame members including a first end configured to be connected to the main frame assembly, a pair of first front frame members connected to and extending upwardly from a respective one of the lower frame members, and a bracket extending laterally across the first front frame members. The bracket can include a left damper mount structure configured to attach a vehicle damper on a left side of the bracket, a right damper mount structure configured to attach a vehicle damper on a right side of the bracket, a radiator mount extending forwardly from the bracket and configured to attach a radiator, hood mounts configured to mount a vehicle hood, a right headlight mount configured to mount a right headlight, and a left headlight mount configured to mount a left headlight.

According to another aspect of the disclosed subject matter, some embodiments are directed to a frame assembly for a vehicle, that includes a pair of longitudinally extending frame members, a pair of first frame members extending upwardly from a respective one of the longitudinally extending frame members, and a transverse bracket frame member extending transversely from and connected to each of the first frame members. A bumper assembly can be connected to each of the first frame members. A pair of suspension members can be movably mounted on a respective one of the first frame members. A left damper can be connected to and extend between the transverse bracket frame member and a left one of the suspension members. A right damper can be connected to and extend between the transverse bracket frame member and a right one of the suspension members. A radiator can have a bottom end and a top end, the bottom end being connected to the bumper assembly and each of the first frame members. A radiator mount structure can extend from and be connected to each of the top end of the radiator and the transverse bracket frame member.

According to another aspect of the disclosed subject matter, a vehicle including a frame assembly for the vehicle can include a passenger main frame assembly configured to protect a passenger compartment of the vehicle. A rear frame assembly can be connected to a rear portion of the passenger main frame assembly. A front frame assembly can be connected to a front portion of the passenger main frame assembly. The front frame assembly can include a pair of longitudinally extending frame members, a pair of first frame members extending upwardly from a respective one of the longitudinally extending frame members, and a transverse bracket frame member extending transversely from and connected to each of the first frame members. A pair of suspension members can be movably mounted on the front frame assembly. A left damper can be connected to and extend between the transverse bracket frame member and a left one of the suspension members. A right damper can be connected to and extend between the transverse bracket frame member and a right one of the suspension members. A hood mount structure can be located on the transverse bracket frame. A headlight mount structure can be located on the transverse bracket frame. A radiator mount structure can also be located on the transverse bracket frame member.

Some embodiments are directed to an all-terrain vehicle that can include a frame assembly, a pair rear wheels, a steering rack assembly, a front suspension and wheel assembly, a final drive assembly, and a load and energy management apparatus. The frame assembly can include a cushion bracket.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
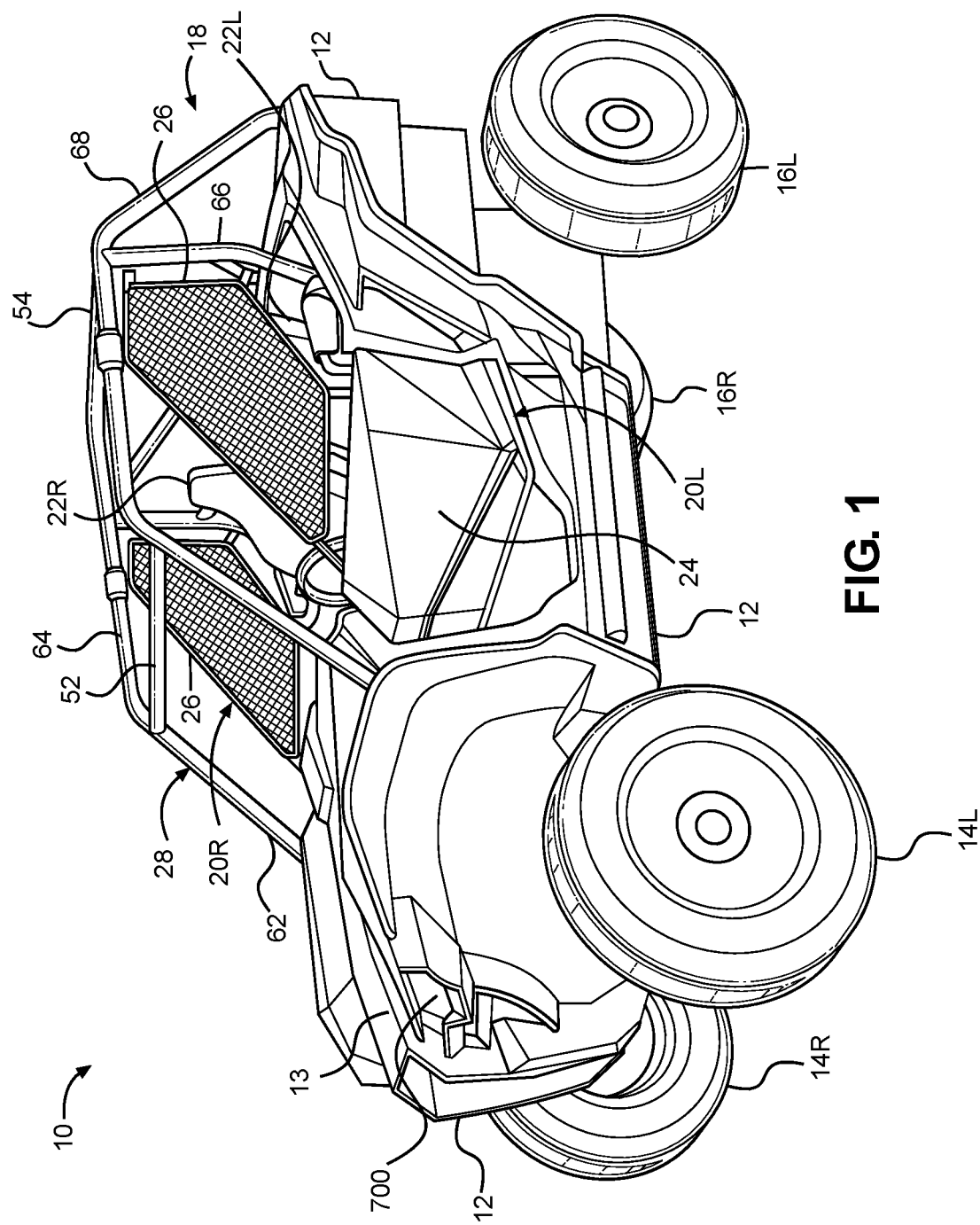
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of the vehicle frame defining the passenger area upon application of significant force inputs into the frame assembly. The stiff portions of the vehicle frame that are spaced from the passenger area, such as but not limited to frame structures around the front suspension components, rear suspension components and/or powertrain components, and even headlight and radiator mounting structures can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area can be subject to deformation due to the input load or kinetic energy. In addition, design parameters for the headlight and hood areas can be limited by typical vehicle frame technology.

It may therefore be beneficial to provide a vehicle and a frame for the vehicle with an apparatus that addresses at least one of the above and/or other challenges of related art vehicles. In particular, it may be beneficial to includes a single part, such as a cushion bracket, that combines the mounting locations for certain structures, such as the headlights, radiator, and dampers, on one stamping. The cushion bracket can tie the right and left sides of the vehicle frame together while mounting the cushions, the radiator, and the headlight/fender stays.

It may also be beneficial to enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy.

In some of these and/or other embodiments, the vehicle frame can be configured to deform at portions spaced from the passenger area. In addition, the frame can be configured with structures that can resist deformation during routine off-road usage of the vehicle, but that can deform in a predetermined controlled manner in response to an input load or kinetic energy. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

It may therefore be beneficial to provide a vehicle with a frame assembly that addresses at least one of the above and/or other disadvantages or concerns of the related art. In particular, it may be beneficial to utilize a frame assembly that is sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. For example, it may be beneficial to utilize a frame assembly that includes a front frame assembly that is configured to distribute loads and/or energy input by each suspension component throughout the entire frame assembly such that the suspension load and/or energy inputs can be transferred to a main frame assembly to which the front frame assembly can be connected. A bridge or cushion bracket can be utilized to tie left and right portions of the frame together while providing an efficient use of space for attaching various vehicle structures, including headlights, radiator, and dampers to the frame assembly.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
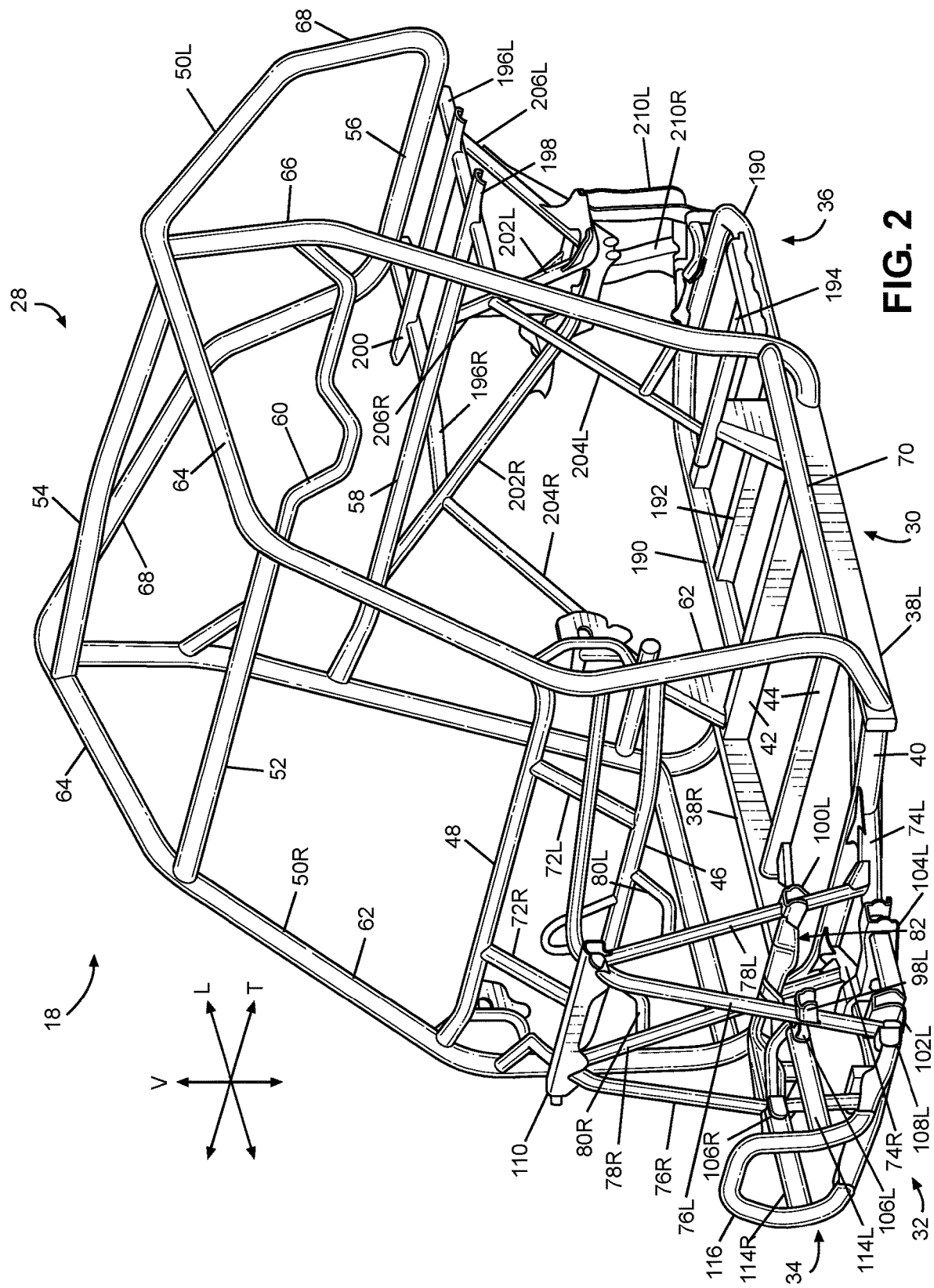
FIG. 2 is perspective view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths, and surrounds the passenger area.

The frame assembly 18 can include a main frame assembly 30, a front frame assembly 32, a front bumper assembly 34 and a rear frame assembly 36. A load and energy management apparatus can distribute loads input by the front suspension on one side of the front frame assembly 32 to the other side of the front frame assembly 32. Further, the load and energy management system can distribute and attenuate loads and energy throughout the front frame assembly 32 that are applied to the front bumper assembly 34 to thereby manage the energy so that any deflection of the frame assembly 18 in the vicinity of the passenger area can be controlled in an advantageous predetermined manner.

The main frame assembly 30 can define the passenger area of the vehicle 10 and provide an overall bending stiffness and torsional stiffness of the vehicle 10 that can be advantageous for rugged terrain of an unimproved path.

The front frame assembly 32 can be connected to the front end of the main frame assembly 30 and can include mounting points for the front suspension components. Various other appropriate components/systems be connected to the front end of the main frame assembly 30, such as but not limited to portions of the body 12, a front final drive assembly, steering system components, engine cooling system, headlights, radiator, dampers, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

Figure 3:
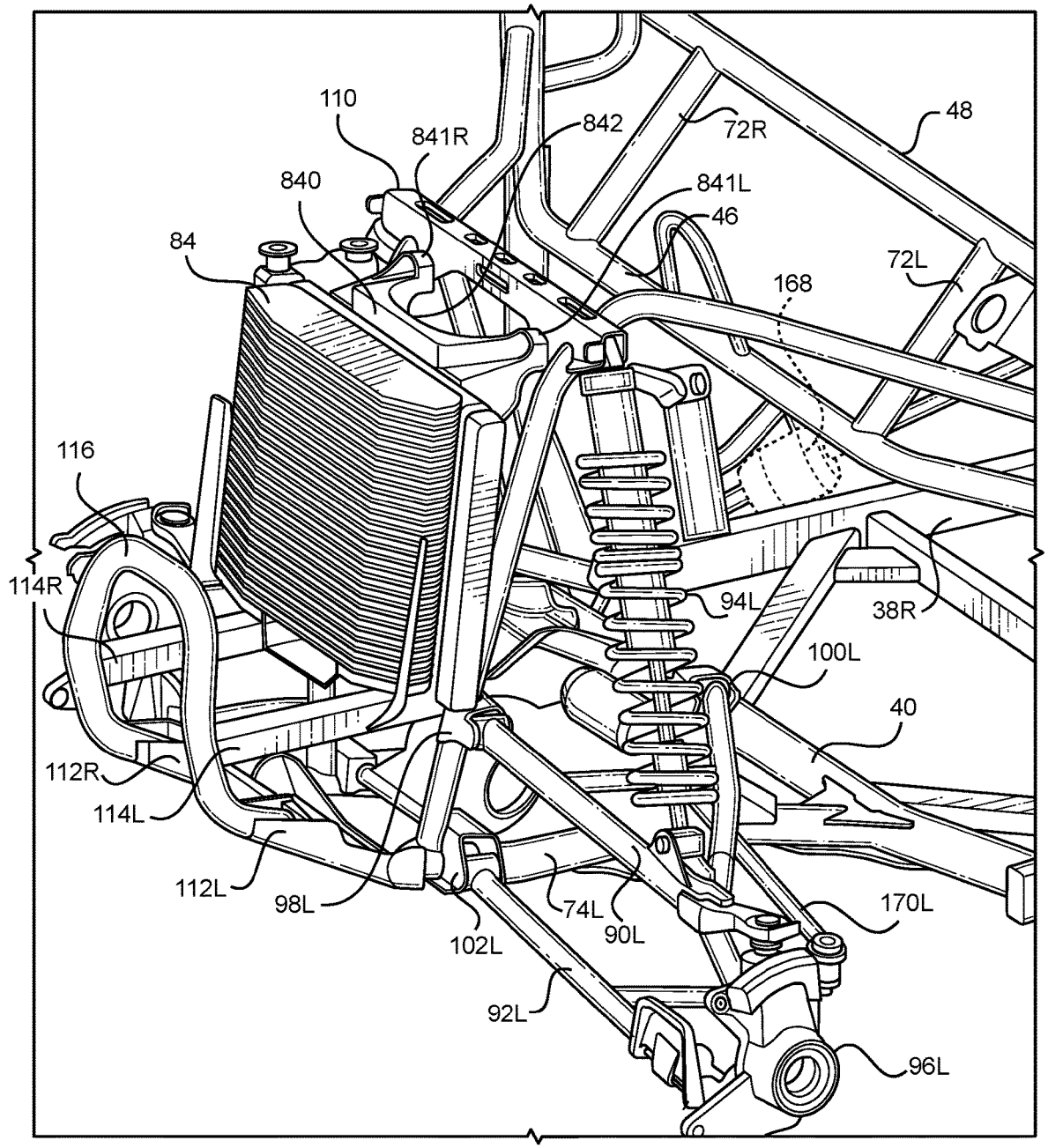
FIG. 3 is a partial perspective view of the frame assembly of FIG. 2 and attached components of the vehicle of FIG. 1.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. Referring to FIG. 3, the front frame assembly 32 can be configured to support a front suspension and wheel assembly, a radiator 84, a steering rack assembly and a front final drive assembly. The front suspension and wheel assembly can include suspension members 90L, 92L, damper and spring assemblies 94L, front hub assemblies 96L and the front wheels 14L, 14R. (The suspension members, the spring and damper assembly and the front hub assembly for the right side of the vehicle 10 are obstructed from view in FIG. 3).

The front frame assembly 32 can include a plurality of mounting brackets 98L, 100L, 102L, 106L, 106R, 108L that can connect the front suspension and wheel assembly, the radiator 84, and the front bumper assembly 34 to the front frame assembly 32. (The mounting brackets on the right side of the vehicle 10 are obstructed from view in FIG. 3). The front suspension and wheel assembly can be movably connected to each of the suspension brackets 98L, 100L, 102L so that the suspension members 90L, 92L can pivot relative to the suspension brackets 98L, 100L, 102L and the front wheels 14L, 14R can move generally in the vertical direction V of the vehicle 10 as the vehicles travels along an improved or unimproved pathway. The front bumper assembly 34 can be connected to each of the bumper brackets. The following description will be directed toward the brackets 98L, 100L, 102L, 106L, and 108L mounted on left side of front frame assembly 32 with the understanding that the brackets mounted on the right side of the front frame assembly 32 can be a mirror image of the brackets 98L, 100L, 102L, 106L, 108L left side of the front frame assembly 32, and can be connected to the right side of the front frame assembly 32 in a similar manner.

Referring to FIGS. 2-15, the left side of the front frame assembly 32 can include a pair of upper suspension brackets 98L, 100L, a pair of lower suspension brackets 102L. (The second lower suspension bracket is obstructed from view in FIG. 3). Referring to FIG. 3, the upper suspension member 90L can be connected to each of the upper suspension brackets 98L, 100L. The lower suspension member 92L can be mounted to the lower suspension brackets 102L in any appropriate manner such as but not limited to threaded fasteners, and with or without rubber bushings. The front bumper assembly 34 can be mounted to the upper bumper bracket 106L and the lower bumper bracket 108L in any appropriate manner such as but not limited to threaded fasteners.

C. Upper Bracket

The front frame assembly 32 can include an upper bracket 110. The upper bracket 110 can be connected to and extend from each of the first frame members 76L, 76R. The upper bracket 110 can extend in the transverse direction T of the vehicle 10 to span from the left first frame member 76L to the right first frame member 76L in order to provide frame stability as well as an attachment point for several vehicle components, including, for example, cushions for connection to the hood and/or headlights.

Referring to FIG. 3, an upper end of each of the spring and damper assemblies 94L, 94R can be connected to a respective end of the upper bracket 110 in an appropriate manner.

Each of the exemplary front lower frame members 74L, 74R, first front frame members 76L, 76R, and second front frame members 78L, 78R are shown as hollow metal tubes having a substantially circular cross-section. However, any combination of the front lower frame members 74L, 74R, the first front frame members 76L, 76R and the second front frame members 78L, 78R can have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

The front frame assembly 32 can include a pair of upper bumper brackets 106L, 106R and a pair of lower bumper brackets 108L that connect the bumper 34 to the front frame 32.

FIG. 3 depicts a perspective view of an exemplary bracket 110 that is attached to each of the front frame members 74L, 74R. The bracket 110 can also be connected to the radiator 84 by a radiator mount located on a front surface of the bracket 110 in this example. The radiator mount can include a radiator mount structure 840 that attaches via typical fasteners or materials to both the bracket 110 and the radiator 84 and can be configured to maintain a separation distance between the bracket 110 and radiator 84 at the top most portion of the radiator 84. In particular, the radiator mount structure 840 can include a central portion 842 located between a left arm 841L and right arm 841R. At a distal most end of each arm 841L, 841R, a connection structure such as a mechanical fastener, adhesive, or weld can be located for attachment to the bracket 110.

Figure 4:
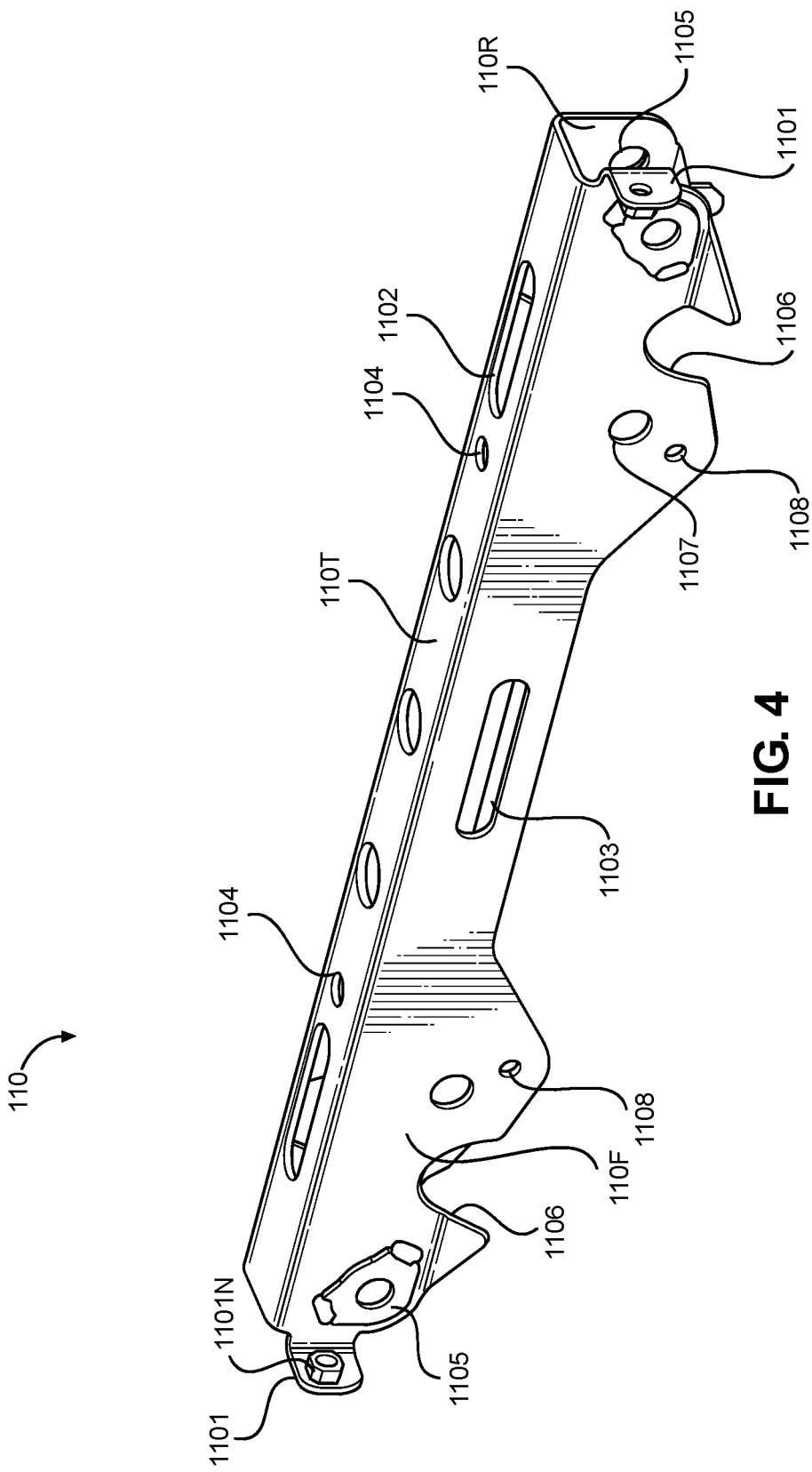
FIG. 4 is a perspective view of a cushion bracket for use with the frame of FIG. 2.
Figure 5:
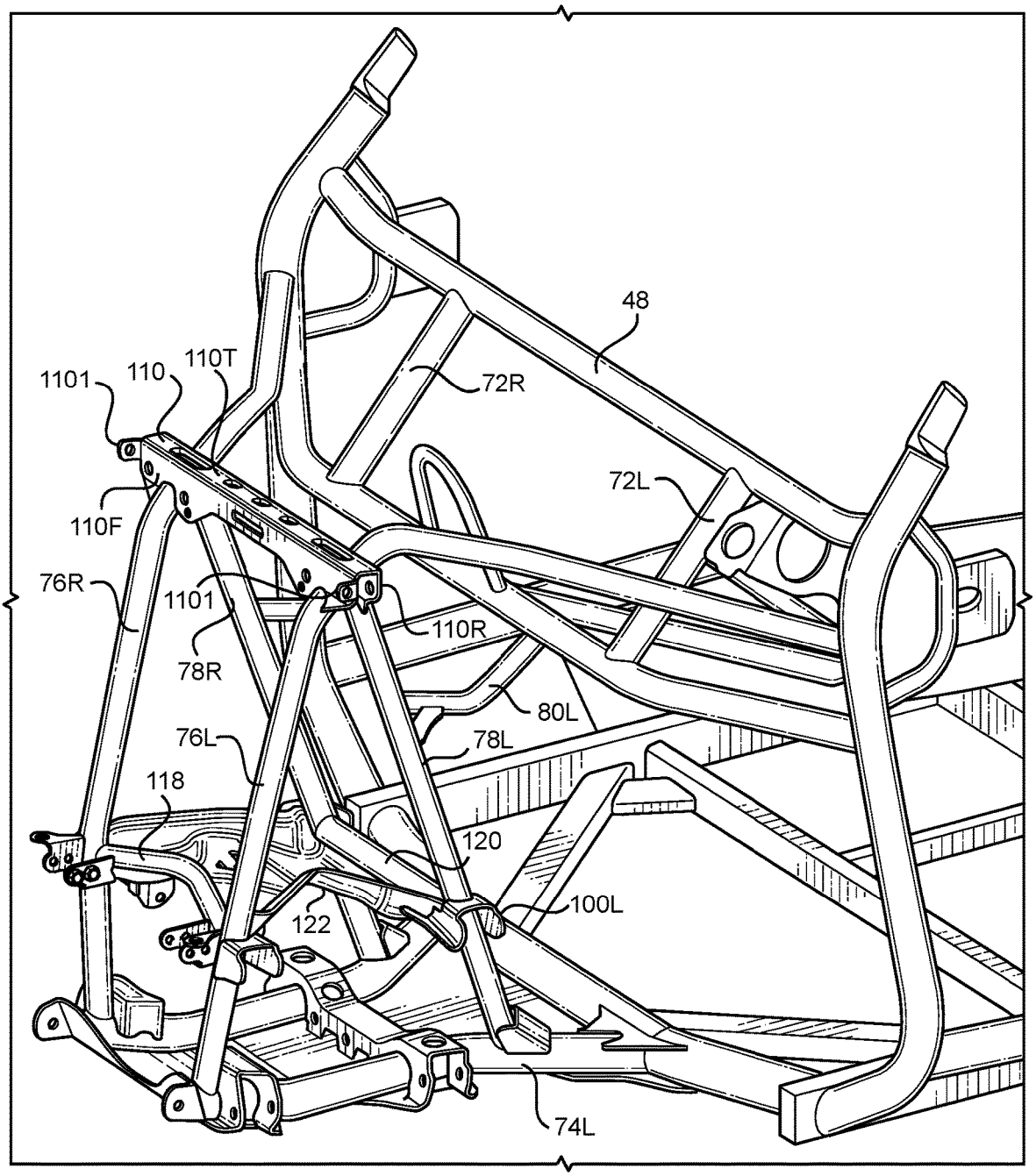
FIG. 5 is a top partial perspective view of the frame of FIG. 2.

FIG. 4 shows a perspective view of the bracket 110 that includes a radiator mount structure hole 1108. In this embodiment, the radiator mount includes a pair of holes 1108 in the front surface 110F of the bracket 110. The radiator mount can also include the radiator mount structure 840 that has arms 841L, 841R for connection via fastener or other connection device or material to the radiator mount holes 1108, and also has central portion 842 for connection to the radiator 84. Another mount hole 1107 can be located immediately adjacent and above the radiator mount hole 1108 on the front surface 110F of the bracket 110. Mount hole 1107 can be used for mounting other accessories to the bracket 110 depending on application for the vehicle. Alternatively, the mount hole 1107 can facilitate a weight reduction for the upper bracket 110 in an embodiment in which no structure is connected directly to the mount hole 1107.

Figure 10:
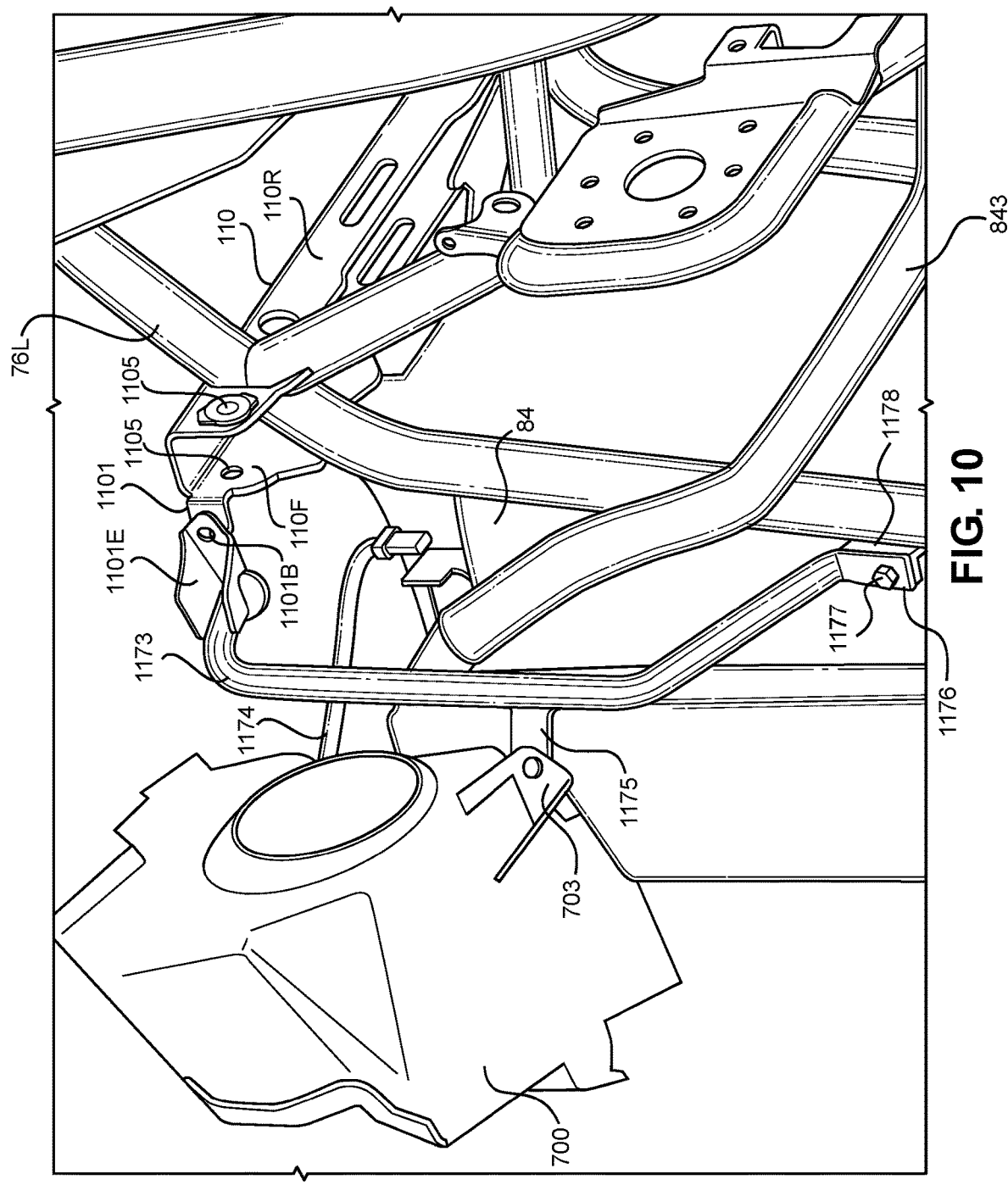
FIG. 10 is a lower rear perspective view of a front portion of the frame of FIG. 2 and attached components of the vehicle.

The bracket 110 can also include headlight mount structure. In the exemplary embodiment shown in FIG. 4, the headlight mount structure includes headlight mount structure tabs 1101 located at distal most ends of the longitudinal axis of the bracket 110. The tabs 1101 can extend from the front surface 110F of the bracket and be formed integrally with the bracket 110 structure itself. A weld nut 1101N can be welded onto the tab 1101 for facilitating attachment of additional portions of the headlight mount structure. In particular, as shown in FIG. 10, a bolt 1011B can be attached to the weld nut 1101N to secure the extension plate 1101E to the tab 1011.

The bracket 110 can also include a frame mount structure for connection to the frame of the vehicle, for example, to the front lower frame members 74L, 74R of the vehicle's front frame assembly 32. For example, the front frame mount structure can include two semi-circular indents 1106 located in both the front surface 110F and rear surface 110R of the upper bracket 110, and between the radiator mount hole 1108 and the headlight mount structure tabs 1101 along the longitudinal axis direction of the upper bracket 110.

The upper bracket 110 can also include damper mount structure for connecting a vehicle damper and spring assemblies 94L, (also referred to as shock absorbers, struts) to the bracket 110. The damper mount structure can include through holes 1105 located in distal and opposing ends of the bracket 110. In the depicted embodiment of FIG. 4, at either end of the bracket 110, the damper mount through holes 1105 are located between the headlight mount tab 1101 and the radiator mount holes 1108 in terms of relative position along the longitudinal axis of the bracket 110.

The bracket 110 can include cushion mount structure located at a top surface 110T of the bracket 110. In this embodiment, the cushion mount structure includes a cushion mount structure hole 1104 extending through the top surface 110T of the bracket 110.

A central opening 1103 can be provided one or both of the front surface 110F and rear surface 110R of the bracket 110 for mounting other apparatus or vehicle components. The opening 1103 can also be provided to reduce the weight of the bracket while maintaining the structural integrity of the bracket 110. The opening 1103 can be symmetrical about both the longitudinal axis and a vertical axis that divides the bracket 110 in half such that the opening 1103 can be used to center the bracket in position during assembly. One or more additional, symmetrical opening(s) 1102 can be located in the top surface 110T of the bracket for purposes similar to those stated above with respect to opening 1103.

Figure 6:
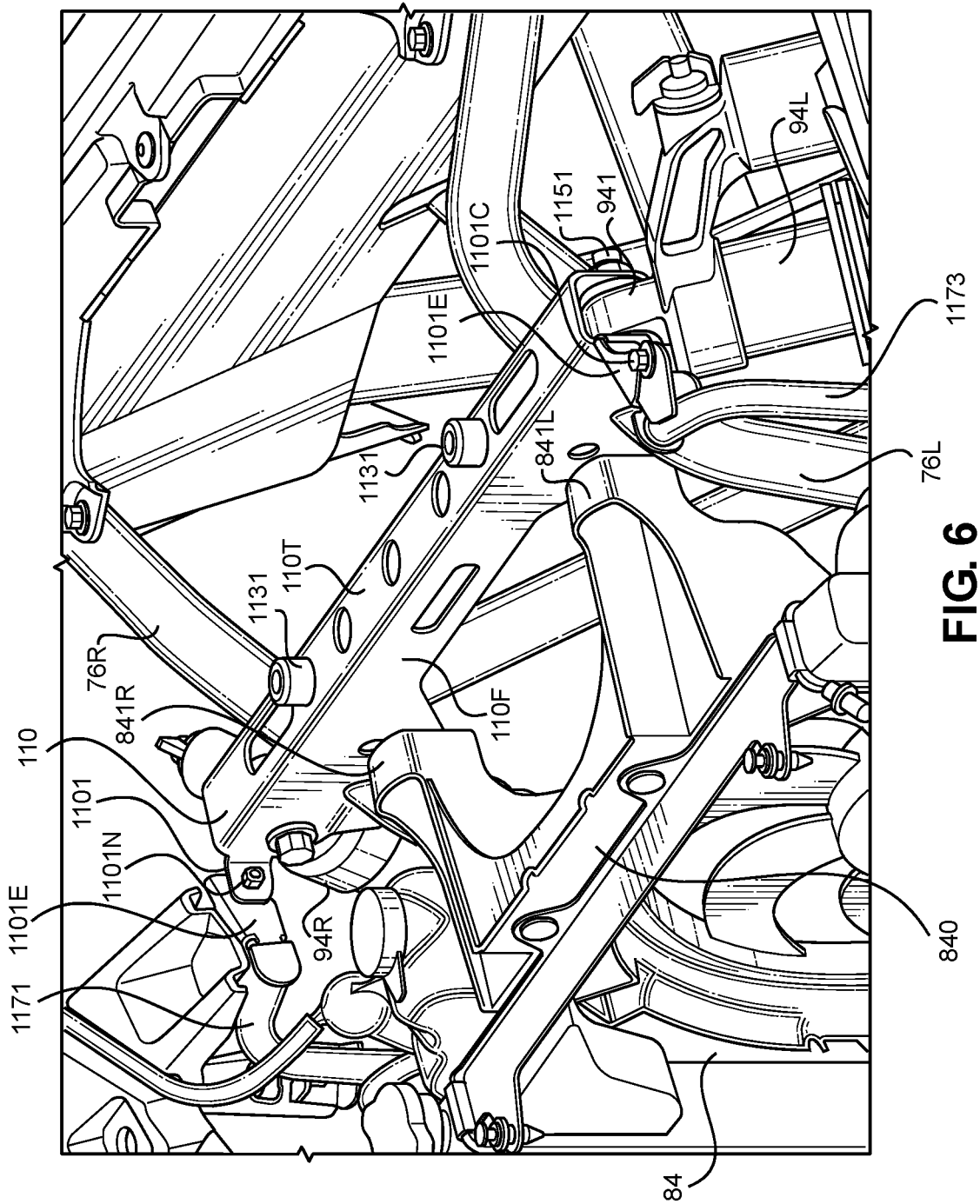
FIG. 6 is a partial perspective view of the frame of FIG. 2 and attached components of the vehicle of FIG. 1.

FIG. 6 shows cushion mount structure including a cushion 1131 assembled and attached to the bracket 110 via the cushion mount structure hole 1104 at the top surface 110T of the bracket 110. In this configuration, the hood 13 is constructed with a negative tolerance when connected to the cushion 1131 such that the hood 13 actually contacts the cushions 1131, and the hood movement and vibration can be dampened by the cushions 1131.

The radiator mount structure can include mount extension structure 840 that has two arms 841L, 841R connected to the front surface 110F of the bracket 110. The mount extension structure 840 can be connected to the top most periphery of the radiator 84 via fasteners such as rivets or screws (or other fastening structures, processes, or materials).

The headlight mount structure can include an extension plate 1101E connected to tab 1101 that extends from the front surface 110F of the bracket 110. The extension plate 1101E can be connected to the tab 1101 via bolt 1101B secured to a weld nut 1101N located on tab 1101. Of course, other known connection devices and structures can be used to make this connection. On the left side of the vehicle 10, the extension plate 1101E can be connected to a left headlight bar 1173 that extends to and ultimately is connected to a headlight 700. The left headlight bar 1173 can be welded to extension plate 1101E, but can also be friction fit or attached via fastener structure(s), processes, or materials. In the depicted exemplary embodiment, a clamp or sandwiching structure that can be selectively tightened and loosened such that the location of attachment for the headlight bar 1173 can be "tuned" or moved around to a certain degree during assembly or repair. At the right side of the vehicle 10, the headlight mount structure can include a right headlight bar 1171 attached to extension plate 1101E and tab 1101 located at a front right portion of the bracket 110.

The damper mount structure can include pivot structure such as bolt 1151 that extends from the rear surface 110R to the front surface 110F of the bracket 110 at opposite distal ends of the bracket 110. It should be noted that the holes 1105 in the front and rear surface at each distal end of the bracket 110, and through which the bolt 1151 can be positioned, are located just inside the connection location for the headlight mount structure (that includes tab 1101 extending from a distal most end of each side of the bracket 110). In other words, the holes 1105 are located closer to a center of the bracket 110 along the longitudinal axis direction of the bracket than are the tabs 1101. A pivot structure 941 located at a top distal end of each damper 94L, 94R can include an opening. The opening in the pivot structure can have a central axis that coincides with the central axis of corresponding holes 1105 located in the bracket 110 (when assembled) such that the bolt 1151 or other pivot structure extends though opening 1105 and opening in pivot structure 941 to act as a pivoting connection point for each respective damper 94L, 94R to the bracket 110.

Figure 7:
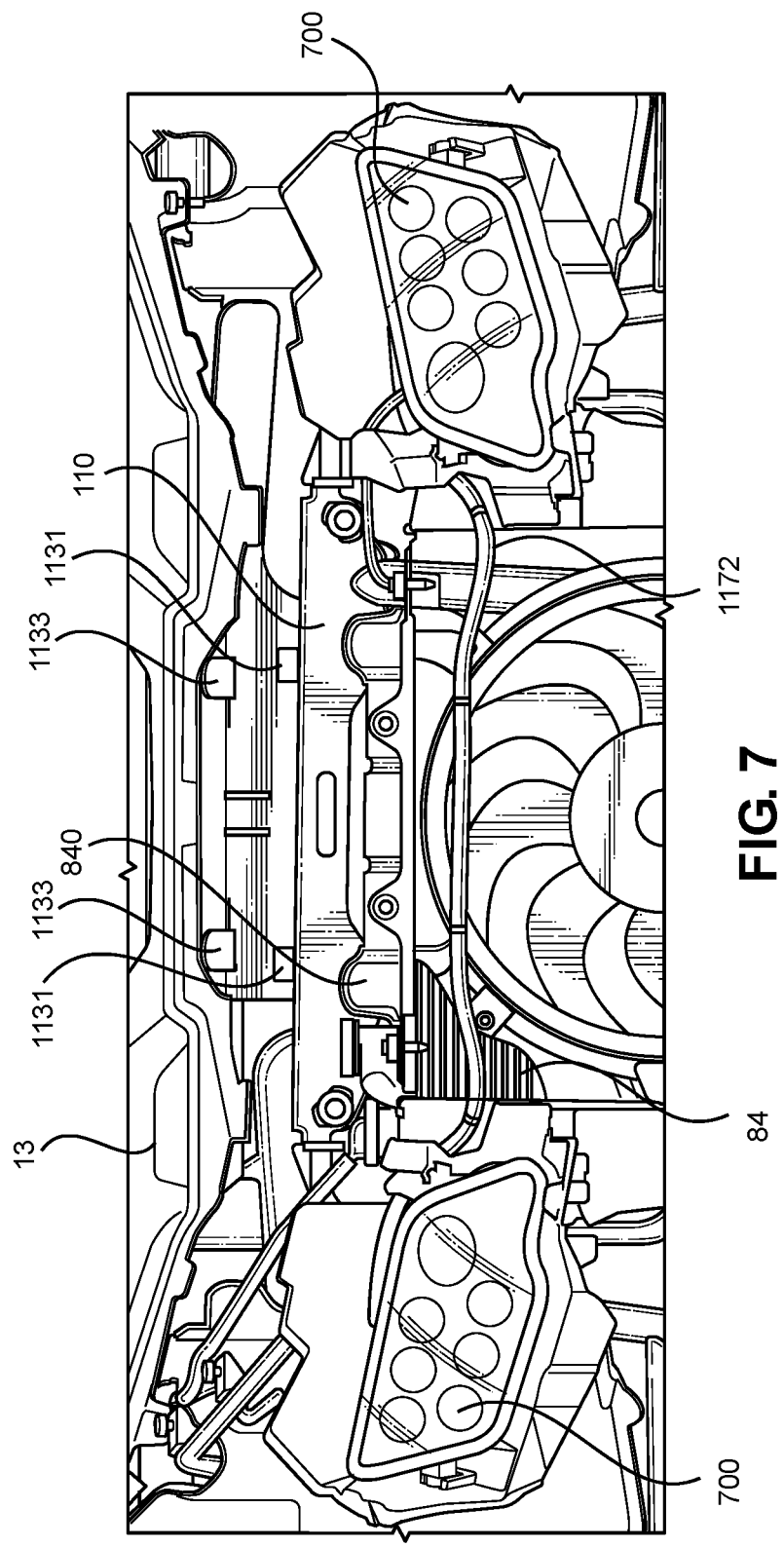
FIG. 7 is a partial front view of the frame assembly of FIG. 2 and attached components of the vehicle of FIG. 1.

FIG. 7 shows a front view of the bracket 110 in its connection location on the front vehicle frame assembly 32. The bracket 110 is located just above the radiator 84 in a vertical direction V in this view, such that the hood 13, when closed, is in contact with the cushions 1131 located on the bracket 110. In this view, the hood 13 is slightly open, and the hood mating structures 1133 that extend from the hood 13 are spaced from the cushions 1131. The hood mount structure of the bracket 110 can include the cushions 1131 that connect via holes 1104 to the top surface 110T of bracket 110, as well as the mating structures 1133. The hood mount structure also can be tuned such that the hood 13 is located just above each of the headlights 700 when the hood 13 in in the closed position.

Figure 8:
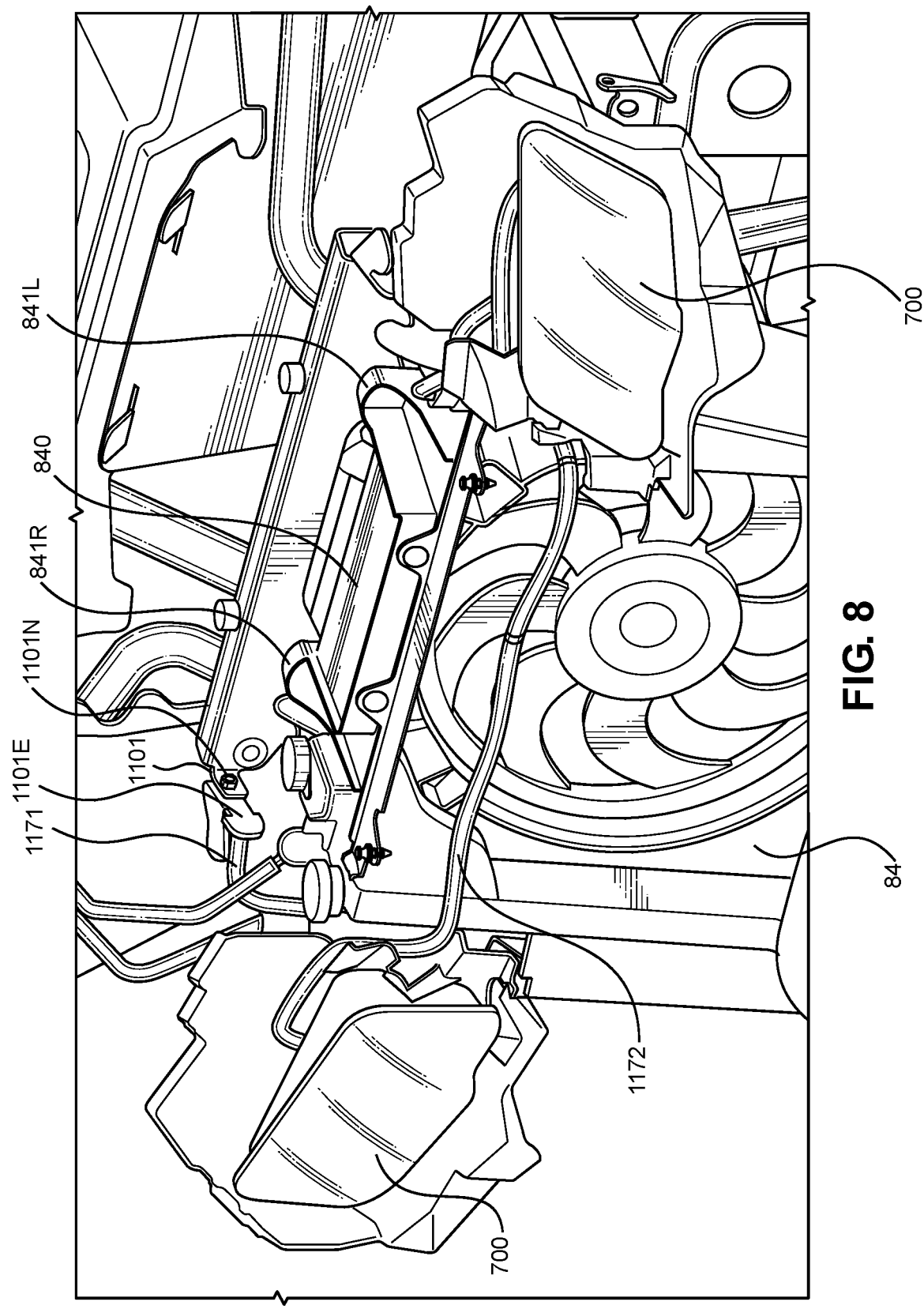
FIG. 8 is a side perspective view of a portion of FIG. 7.
Figure 9:
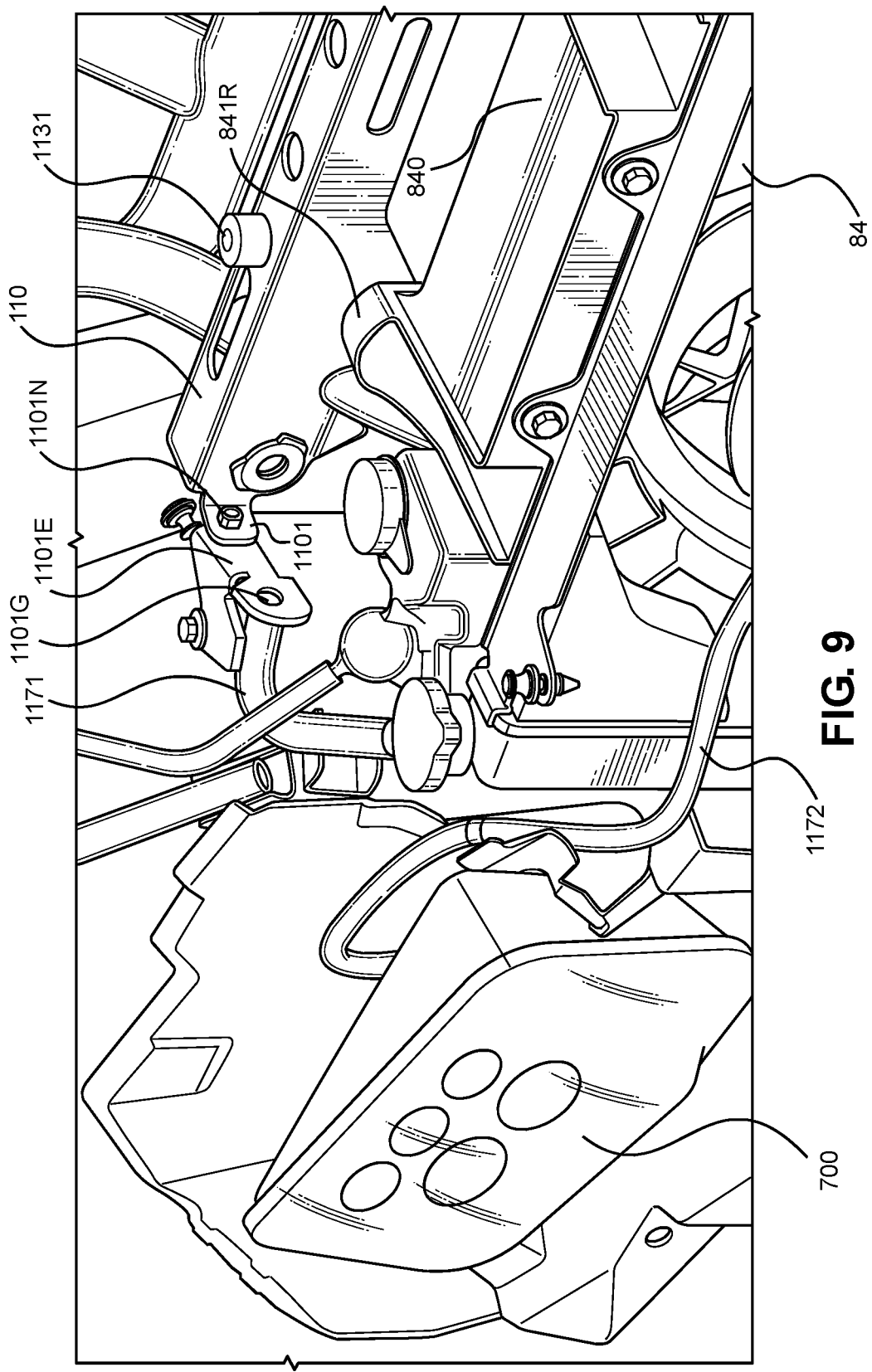
FIG. 9 is a side perspective view of a portion of FIG. 8.

FIGS. 8 and 9 show additional perspective views of the bracket 110 located within the front frame assembly 32 and positioned adjacent the radiator 84 and headlights 700. In these views, the headlight mount structure can include a left headlight bar 1171 connecting a left headlight to the bracket 110 via tab 1101 and extension plate 1101E, a central headlight bar 1172 extending between the headlights 700, and a right headlight bar 1173 (hidden in these views) connecting a right headlight 700 to the bracket 110 via tab 1101 and extension plate 1101E. Another embodiment of the radiator mount extension 840 is depicted in these embodiments, and attaches the radiator 84 to the bracket 110 via arms 841L, 841R. In this embodiment, the radiator mount extension 840 includes a box shaped central portion that includes a rib extending around a periphery thereof for support and structural integrity. As can be seen in FIG. 9, an aperture or opening 1101G can be located in the extension plate 1101E for attachment to headlight bar 1171 via screw, bolt, rivet, or other attachment structure, if desired.

FIG. 10 is a lower rear perspective view of a front left portion of the frame of the vehicle. The connection between the left headlight bar 1173 and left headlight can be more clearly seen in this view (driver side of vehicle for U.S. applications). Specifically, in this embodiment, the left headlight bar 1173 is attached to the bracket 110 via extension plate 1101E and tab 1101. A post 1175 extends horizontally from a mid portion of the left headlight bar 1173 to connect to a headlight tab 703 extending from headlight 700 for connection thereto. An opposite end (opposite from end connecting to extension 1101E and tab 1101) of the left headlight bar 1173 can be attached to a portion of the radiator 84 or lower portion of first frame member 76L to secure the headlight bar 1173 in place. For example, a bracket 1178 can be welded onto the first front frame members 76L, 76R, and the headlight bars 1171, 1173 can include a mounting tab 1176 that can be secured to the bracket 1178 via a threaded fastener 1177. In this view, the attachment between the first front frame member 76L and the bracket 110 can be clearly seen, as the front frame member 76L extends at an angle downward through the rear surface 110R of the bracket 110 to the front surface 110F. Thus, the openings 1106 in the front surface 110F and rear surface 110R will be sized differently because a larger portion of the front lower member 76L passes through the rear surface 110R of the bracket 110 as compared to the portion of the front lower frame member 76L that passes through the front surface 110F of the bracket 110. The headlight mount structure can further include a top radiator bar 1174 that connects between an inward surface of the headlight 700 and the radiator 84 to further stabilize and position the headlights 700 within the vehicle frame.

Figure 11:
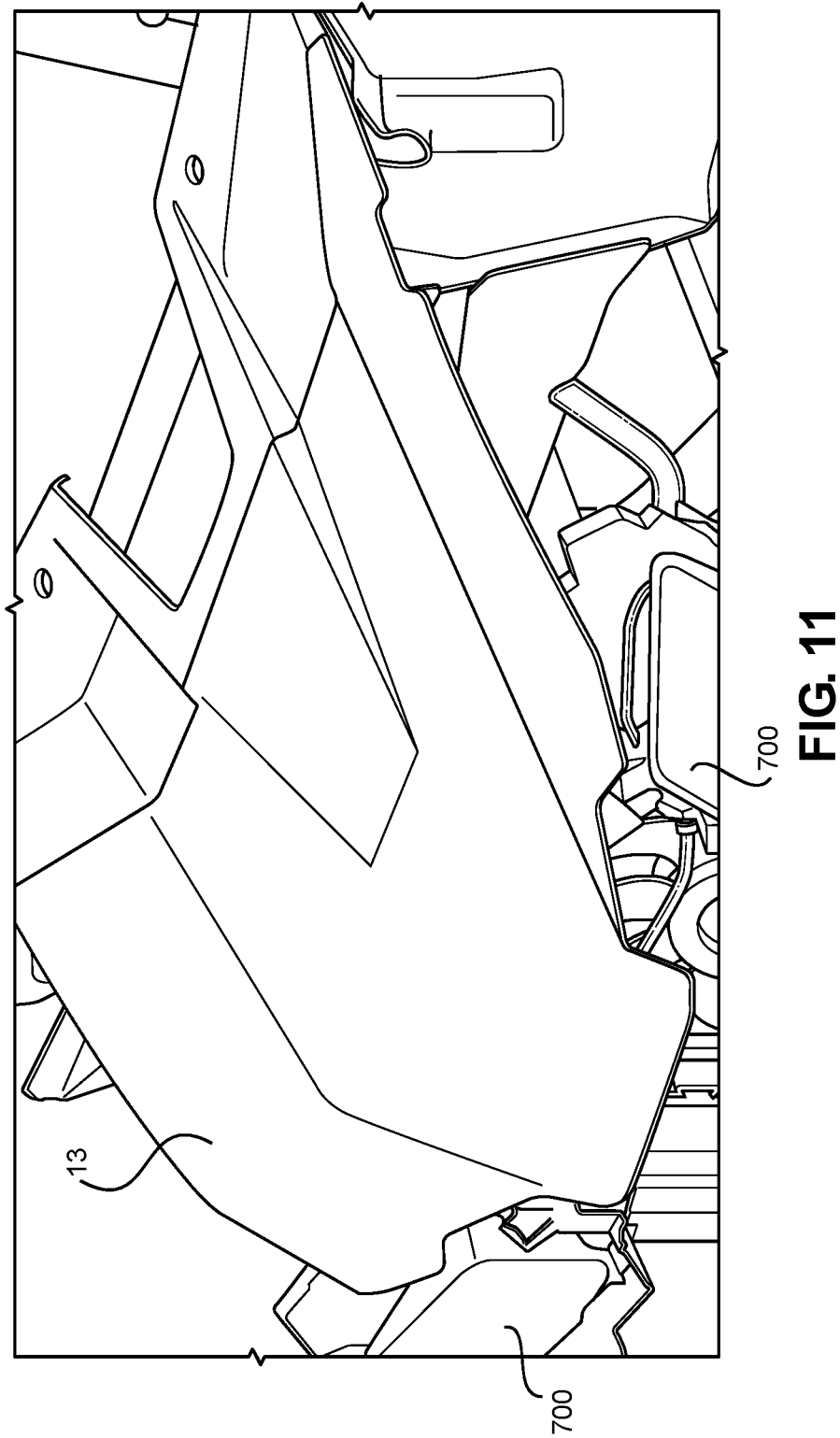
FIG. 11 is a top forward perspective view of a front portion of the frame of FIG. 2 and attached components of the vehicle.
Figure 12:
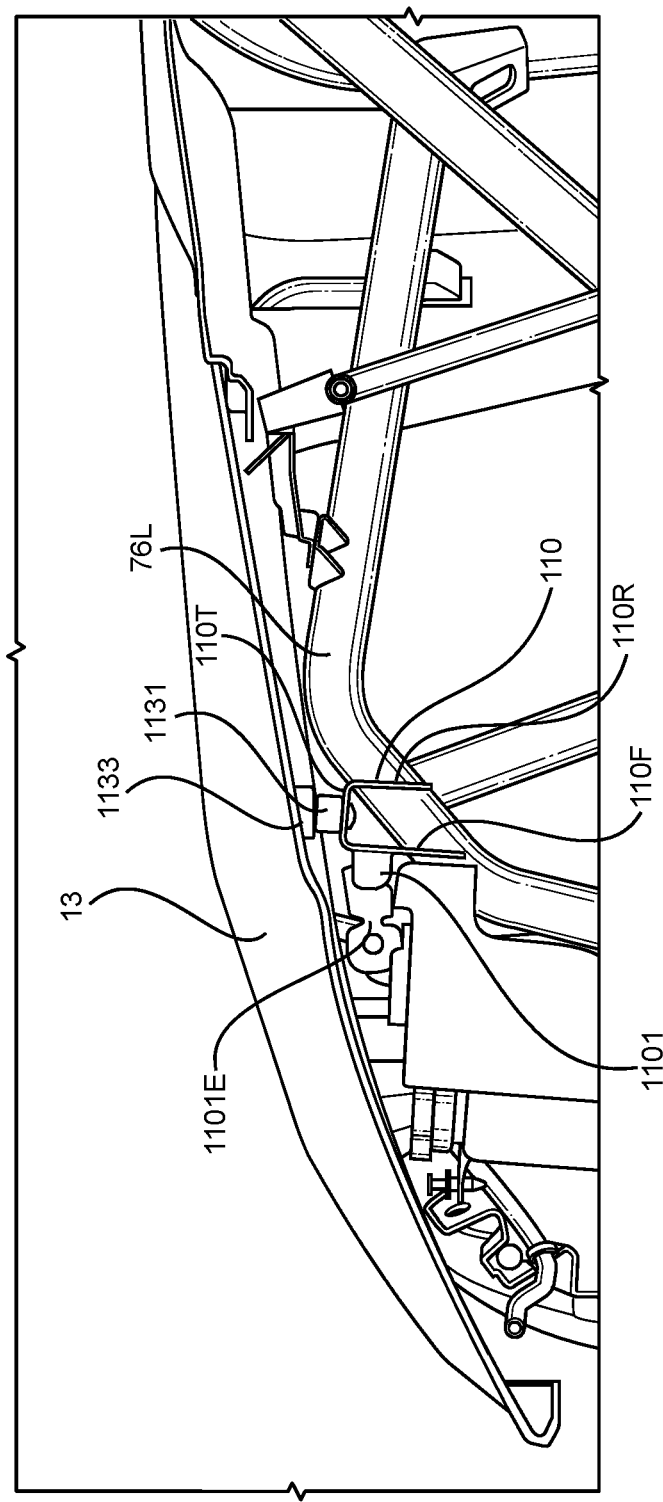
FIG. 12 is a side view of a front portion of the frame assembly of FIG. 2 and attached components of the vehicle.

FIGS. 11 and 12 are a top forward perspective view and a side view, respectively, of a front portion of the vehicle with the hood 13 in the closed position. In this position, the hood mating structure 1133 mates with and is in contact with the cushions 1131 attached to the bracket 110. The hood mating structure 1133 can be formed in the hood 13 or can be separate structures attached to the inner surface of hood 13. The cushions 1131 can be ring like structure made from rubber or other material that provides an amount of dampening between the hood 13 and the bracket 110 (and frame) of the vehicle. The cushions can include a central attachment structures and fastener for attachment to the holes 1104 in the top surface 110T of the bracket 110. FIG. 12 also shows the angular attachment between the front lower frame member 76L and the bracket 110. The hood mating structure 1133 can merely abut the cushions 1131 with a negative clearance. Alternatively, the mating structures 1133 can be connected to the cushions 1131 via threaded fasteners.

D. Front Bumper Assembly

The front frame assembly 32 can include the front bumper assembly 34. Referring to FIGS. 2 and 3, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can include a pair of lower connector members 112L, 112R, a pair of upper connector members 114L, 114R and a bumper member 116. The bumper member 116 can be a separate structure connected to each of the connector members 112L, 112R, 114L, 114R, or can all be integrated together into a single structure. The bumper member 116 can extend in the transverse direction T of the vehicle 10 to span from the left upper connector member 114L to the right upper connector member 114R.

A first end of each of the lower connector members 112L, 112R can be connected to a respective one of the lower bumper brackets 108L. (The right-side lower bumper bracket is obstructed from view). Lower connector members 112L, 112R can be connected to the respective one of the bumper brackets such that the lower connector members 112L, 112R can pivot with respect to the lower bumper brackets 108L. The second end of the lower connector members 112L, 112R can be connected to the bumper member 116.

A first end of the upper connector members 114L, 114R can be connected to a respective one of the upper bumper brackets 106L, 106R. The second end of the upper connector members 114L, 114R can be connected to the bumper member 116.

The upper connector members 114L, 114R can be configured to deform in a predetermined and controlled manner in response to load or kinetic energy input to the bumper member 116 that exceeds a predetermined threshold. For example, the upper connector members 114L, 114R can be configured to collapse along the length of the upper connector members 114L, 114R. That is, the upper connector members 114L, 114R can be formed from any material and/or with any structure that can promote the desired deformation. By way of example only, the upper connector members 114L, 114R can be elongate members having a rectangular cross-sectional shape. Further, by way of example only, the upper connector members 114L, 114R can include one or more holes, cutouts, corrugated regions, bends, any combination thereof, etc., that can permit the upper connector members 114L, 114R to deform in a predetermined and controlled manner during an impact event.

The lower connector members 112L, 112R can pivot relative the lower bumper brackets 108L as the upper connector members 114L, 114R collapse. However, exemplary embodiments are intended to include any appropriate connection that can achieve the desired performance of the bumper assembly 34 in response to a load and/or energy that exceeds a predetermined threshold. The predetermined threshold can be set at a value where only the front bumper assembly 34 is subjected to deformation by the load or kinetic energy input to the bumper member 116, without deformation to the front frame assembly 32 or the main frame member 30.

The bumper member 116 can be configured with any appropriate shape and dimensions that can achieve the desired performance of the front bumper assembly 34 in response to the load or kinetic energy input.

The upper bumper brackets 106L, 106R can include a flange to which a bottom of the radiator 84 can be connected in any appropriate manner such as but not limited to threaded fasteners, rivets, and welding. In an exemplary embodiment, each of the upper bumper brackets 106L, 106R can include a hole and the radiator 84 can include a pair of posts. A rubber grommet can be secured in each bracket hole. The radiator posts can be inserted into the grommets and the top end of the radiator 84 can be bolted to an appropriate portion of the front frame assembly 32.

E. Transverse Frame Assembly

The transverse frame assembly 82 can extend in the longitudinal direction L, the transverse direction T and the vertical direction V. Referring to FIG. 2, the transverse frame assembly 82 can be connected to and extend from each of the first and second frame members 76L, 76R, 78L, 78R. The transverse frame assembly 82 can be configured to cooperate with the front final drive assembly to transfer load or kinetic energy inputs from the front suspension and wheel assembly into each of the front lower frame members 74L, 74R, which in turn, can be configured to transfer the load or kinetic energy input into the first lower cross member 40 of the main frame assembly 30.

F. Rear Frame Assembly

Referring to FIG. 2, the rear frame assembly 36 can include a plurality of rear frame members 190, 192, 194, 196L, 196R, 198, 200, 202L, 202R, 204L, 204R, 206L, 206R, 210L, 210R. The rear frame members 190, 192, 194, 196L, 196R, 198, 200, 202L, 202R, 204L, 204R, 206L, 206R, 210L, 210R can be configured to define a lower cradle assembly, an upper bed support assembly, and a suspension support assembly. The lower cradle assembly can be configured to mount and supporting the power source and a portion of the rear suspension and wheel assembly in any appropriate manner. The upper bed support can be configured to support a storage area of the vehicle 10. The suspension support assembly can be configured to support another portion of the rear suspension and wheel assembly.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

The suspension members 90L, 92L, of the front suspension and wheel assembly can be configured as a double-wishbone suspension system (also referred to as upper and lower A-arms). Each of the suspension members 90L, 92L, includes a pair of mounting points configured to be connected to a respective pair of the suspension brackets 100L, 102L. Each of the suspension members 90L, 92L can further include a single mounting point configured to be connected to a wheel hub or knuckle that can rotatably support a respective one of the front wheels 14L, 14R. However, exemplary embodiments are intend to include or otherwise cover suspension members that provide a different geometry and/or include multiple links, a strut, or other appropriate members in order to achieve the desired suspension performance so long as at least one of the suspension members on each side of the front frame assembly 32 is mounted to a suspension mounting bracket in accordance with the first upper mounting brackets 98L.

The rear suspension and wheel assembly can include the rear wheels 16L, 16R and at least one suspension member for each of the rear wheels 16L, 16R. The rear suspension and wheel assembly can include any appropriate suspension members, such as those described above for the front suspension and wheel assembly. Further, the rear suspension and wheel assembly can have the same type of suspension members as the front suspension and wheel assembly, or can have a different type of suspension members as compared to the front suspension and wheel assembly. For example, the rear suspension and wheel assembly can include a first rear suspension member, a second suspension member and a third suspension member connected on each side of the rear frame assembly 36. The first and second suspension members can be connected to each of the rear frame assembly 36 and a respective one of the rear wheels 16L, 16R. The third rear suspension member can be connected to a rear end portion of the main frame assembly 30 and connected to the respective one of the rear wheels 16L, 16R. In another exemplary embodiment, the rear suspension and wheel assembly can include the first, second and third suspension members described above, and can additionally include a fourth suspension member connected on each side of the rear frame assembly. However, exemplary embodiments are intended to include or otherwise cover a rear suspension and wheel assembly that includes at least one rear suspension member connected to the rear frame assembly 36.

IV. Steering Assembly

The vehicle 10 can include a steering assembly configured to transfer steering inputs from an operator in the passenger compartment of the main frame assembly 30 to the front wheels 14L, 14R. The steering assembly can include a steering wheel, a steering column assembly 168, a steering rack assembly, and a pair of tie rods 170L. The steering column assembly 168 is shown in phantom.

V. Final Drive Assembly

A final drive assembly can be provided on the frame to transfer torque output by the power source to each of the front wheels 14L, 14R.

The final drive assembly can include a housing that contains any appropriate mechanism that can transmit torque input to the mechanism to each of the front wheels 14L, 14R. For example, the housing can contain an input structure and an output structure. The input structure can be configured to receive torque from a power source. The output structure can be configured to transfer at least a portion of the torque to at least one of the wheels 14L, 14R. The input structure can include an input gear driven by the power source. The output structure can be an output gear driven by the input gear. The output gear can drive one or each of a pair of driveshafts. Each of the driveshafts can drive a respective one of the front wheels 14L, 14R. In another example, a differential gear assembly can couple the output gear to each of the driveshafts such that each of the wheels 14L, 14R can be driven at different speeds and different percentages of the torque input by the power source. In yet another example, a plurality of friction members can be arranged such that torque input by the power source can be differentially distributed to each of the driveshafts.

The driveshafts can include one or more shaft segments and at least one of the shaft segments extends into a respective one of the openings in the housing. The driveshafts can be coupled to the output structure mounted inside of the housing and to a respective one of the front wheels 14L, 14R in any appropriate manner such as but not limited to universal joints, constant-velocity joints, splines, combinations thereof, or via other known output coupling structures.

VI. Load and Kinetic Energy Management Apparatus

The features of the front frame assembly 32 described can form a load and kinetic energy management apparatus. The load and kinetic energy management apparatus can distribute throughout the front frame assembly 32 a load or kinetic energy input to the front frame assembly 32 via one or both of the front wheels 14L, 14R as the vehicle 10 travels along an improved or unimproved path such that load concentrations in any one particular component or portion of the front frame assembly 32 can be reduced or prevented. Further, the load and kinetic energy management apparatus can absorb and distribute a load or kinetic energy input via the front bumper assembly 34 such that deformation of the front frame assembly 32 can occur in a predetermined and controlled manner.

The load and kinetic energy management apparatus can include the first upper suspension brackets 98L, 98R connected to the first front frame members 76L, 76R at a first location on the first front frame members 76L, 76R. This first location can be spaced above the front lower frame members 74L, 74R and below a location where the second front fame members 78L, 78R connect to the first front frame members 76L, 76R.

The load and kinetic energy management apparatus can include the front bumper assembly 34 and the transverse frame assembly 82. The front bumper assembly 34 can be connected to a second location on each of the first front frame members 76L, 76R that is adjacent to the first location where the first upper suspension brackets 98L are connected. For example, first upper suspension brackets 98L and the front bumper assembly 34 can be connected to a common length of the first frame members 76L, 76R that is spaced away from the lower frame members 74L, 74R in the vertical direction V of the vehicle 10. The transverse frame assembly 82 can be connected to the first front frame members 76L, 76R at a third location that is adjacent to the each of the first and second locations. That is, the load and energy management apparatus can include the first front cross member 118 connected to each of the first frame members at the third location such that the first location, the second location and the third location on the common length of the first front frame members 76L, 76R can define a common node through which the load and energy management apparatus can transmit a load or kinetic energy input in each of the transverse direction T of the vehicle 10 and the longitudinal direction L of the vehicle 10 to the front lower frame members 74L, 74R and the main frame 30.

In the exemplary embodiment described above, when following the load and energy distribution paths described above, the load and energy management apparatus can transmit a load or kinetic energy input to one of the first front frame members 76L, 76R to each of the front lower frame members 74L, 74R via the upper housing extension and a different one of the first frame members 74L, 74R. Further, the load and energy management apparatus can transmit a load or kinetic energy input by the front bumper assembly 34 to the transverse frame assembly 82 such that the transverse frame assembly 82 can resist the load or kinetic energy input via the front bumper assembly 34 until the front bumper assembly 34 initially collapses in the longitudinal direction L of the vehicle 10. Further, the transverse frame assembly 82 can collapse in the direction toward the main frame assembly 30 if the load or kinetic energy continues to be inputted to the first front frame members 76L, 76R via the front bumper assembly 34 after the front bumper assembly 34 initially collapses. Accordingly, the frame assembly 18 of the vehicle 10 can provide rigidity sufficient to absorb and distribute a load or kinetic energy input by the front suspension and wheel assembly without undesirable deformation of the front frame assembly 32. Further, the frame assembly 18 of the vehicle 10 can provide an ability to absorb and distribute a load or kinetic energy input by the front bumper assembly 34 that can permit deformation of the front frame assembly 32 in a predetermined and controlled manner.

VII. Alternative Embodiments

While certain embodiments of the invention are described above, and FIGS. 1-12 disclose a best mode for practicing the various inventive aspects, it should be understood that the invention can be embodied and configured in many different ways without departing from the spirit and scope of the invention.

For example, the headlight bars 1171, 1172, 1173, 1174 can be solid or hollow bars (tubes), or other elongate structures such as rebar type materials, and can be made from various materials including metals, plastics, ceramics, carbon fibers, paper and composites of these materials. The cross sectional shape of the headlight bars can be circular, square, rectangular, non-symmetrical or various other shapes depending on application. It should be noted that throughout the drawings, that if a left side component is shown in an alternate view, it can be assumed that the corresponding right side component can be similarly or exactly configured in mirror fashion. For example, the right headlight bar 1171 can be a mirror copy of left headlight bar 1173, and can include the same extension and attachment components to the right headlight and radiator, etc.

In addition, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

The bracket 110 is shown as an elongate structure having three orthogonal surfaces 110F, 110F, and 110R. However, the bracket 110 can assume various different shapes and still remain within the scope of the presently disclosed subject matter. For example, the bracket 110 could include yet another surface, such as a bottom surface, that encloses the structure to form a hollow rectangular tube-like bracket. The different side surfaces can also be at acute angles with respect to each other and have variance in angular relationship along their longitudinal axis direction with respect to each other and/or with respect to each surface itself. Any of the bracket and mount structures can be integrally formed or formed as separate parts that are then joined or attached to each other.

Exemplary embodiments are intended to include or otherwise cover any type of front frame assembly 32. In other words, exemplary embodiments are intended to cover any application of front frame assembly that can sustain load or kinetic energy inputs from a front suspension and wheel assembly while also being capable of responding in a predetermined and controlled manner to a load or kinetic energy input in the longitudinal direction of the vehicle 10. For example, one or both of the first and second frame members can be made from a plurality of parts or made as a unitary homogenous component.

Exemplary embodiments are intended to include any appropriate shape for each of the first and second frame members. Further, exemplary embodiments are intended to include the first frame members and the second frame members divided differently as compared to the first and second frame members described above. For example, exemplary embodiments are intended to include or otherwise cover a first frame member that terminates at a junction with the second frame member, and the second frame member includes a second end that is connected to the main frame assembly.

Exemplary embodiments are intended to include or otherwise cover the first frame member or the second frame member connected to any appropriate portion of the main frame assembly.

Exemplary embodiments are intended to include or otherwise cover any type of front suspension and wheel assembly. For example, embodiments are disclosed in the context of an upper suspension member and a lower suspension member that are configured as A-arms (also referred to as wishbones). Exemplary embodiments are intended to include an upper suspension member that has a unique geometry compared to the lower suspension member. Exemplary embodiments are also intended to include an upper suspension member that has the same geometry compared to the lower suspension member. Further, exemplary embodiments are intended to include a front suspension and wheel assembly that includes one or more suspension members configured differently than the upper suspension member and the lower suspension member, and used in place of the upper suspension member and/or the lower suspension members.

Embodiments are disclosed above in the context of vehicle 10 shown in FIG. 1 having a front frame assembly that includes a front bumper assembly. However, embodiments are intended to include or otherwise cover a vehicle that includes a rear frame assembly, a rear bumper assembly and a rear suspension and wheel assembly configured in a manner as described above with respect to the front frame assembly, the front bumper assembly and the front suspension and wheel assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A front frame assembly of a vehicle, comprising:
   a pair of lower frame members extending in a longitudinal direction of the vehicle and spaced apart from each other in a transverse direction of the vehicle, each of the lower frame members including a first end configured to be connected to the main frame assembly;
   a pair of first front frame members connected to and extending upwardly from a respective one of the lower frame members;
   a bracket extending laterally across the first front frame members and including,
      a left damper mount structure configured to attach a vehicle damper on a left side of the bracket,
      a right damper mount structure configured to attach a vehicle damper on a right side of the bracket,
      a radiator mount extending forwardly from the bracket and configured to attach a radiator,
      hood mounts configured to mount a vehicle hood,
      a right headlight mount configured to mount a right headlight, and
      a left headlight mount configured to mount a left headlight.

2. The front frame assembly of a vehicle according to claim 1, wherein the bracket includes a top surface and the hood mounts include at least two cushion members attached to the top surface of the bracket and in contact with the vehicle hood.

3. The front frame assembly of a vehicle according to claim 1, wherein the bracket includes a front surface and the radiator mount is located at the front surface of the bracket.

4. The front frame assembly of a vehicle according to claim 3, wherein the radiator mount includes an extension structure that includes a first arm and a second arm each extending from a central portion located therebetween, each of the first arm and second arm are connected to the front surface of the bracket.

5. The front frame assembly of a vehicle according to claim 3, wherein the right headlight mount and left headlight mount are located on the front surface of the bracket, and the right headlight mount is located at a right terminal end of the bracket and the left headlight mount is located at a left terminal end of the bracket, such that the radiator mount, hood mounts, left damper mount, and right damper mount are located between the left headlight mount and the right headlight mount.

6. The front frame assembly of a vehicle according to claim 1, wherein the right headlight mount and is located at a right terminal end of the bracket and the left headlight mount is located at a left terminal end of the bracket, such that the radiator mount, hood mounts, left damper mount, and right damper mount are located between the left headlight mount and the right headlight mount.

7. The front frame assembly of a vehicle according to claim 1, wherein the bracket includes a top surface, a front surface, and a rear surface, and the front surfaces and rear surface extend in a parallel fashion with respect to each other, and the right damper mount includes a pivot structure that extends from the front surface to the rear surface of the bracket, and the left damper mount includes a pivot structure that extends from the front surface to the rear surface of the bracket.

8. The front frame assembly of a vehicle according to claim 7, wherein the right headlight mount is located at a right terminal end of the bracket and the left headlight mount is located at a left terminal end of the bracket, such that the radiator mount, hood mounts, left damper mount, and right damper mount are located between the left headlight mount and the right headlight mount.

9. The front frame assembly of a vehicle according to claim 1, wherein the bracket includes a top surface and a front surface, and the right headlight mount includes a right tab extending from the front surface of the bracket, and the left headlight mount includes a left tab extending from the front surface of the bracket, the right headlight mount including a right bar connected to the right tab, and the left headlight mount including a left bar connected to the left tab.

10. The front frame assembly of a vehicle according to claim 9, further comprising:
    a right headlight connected to the right bar;
    a left headlight connected to the left bar; and
    a central bar connected between the right headlight and left headlight.

11. The front frame assembly of a vehicle according to claim 1, wherein
    the right headlight mount is located at a right terminal end of the bracket and the left headlight mount is located at a left terminal end of the bracket,
    the right damper mount is located adjacent the right headlight mount and the left damper mount is located adjacent the left headlight mount,
    the first front frame members are connected to the bracket at locations between the right damper mount and the left damper mount.

12. The front frame assembly of a vehicle according to claim 11, wherein the radiator mount and hood mounts are located between the connection locations of the first frame members.

13. The front frame assembly of a vehicle according to claim 1, wherein the bracket includes a top surface a front surface and a rear surface spaced from the front surface by the top surface, and the radiator mount, the right headlight mount, the left headlight mount, the right damper mount, and the left damper mount are located on the front surface of the bracket, and the hood mounts are located on the top surface of the bracket.

14. The front frame assembly of a vehicle according to claim 1, wherein the vehicle damper is one of a shock absorber and a strut.

15. A frame assembly for a vehicle, comprising:
    a front frame assembly including:
       a pair of longitudinally extending frame members;
       a pair of first frame members extending upwardly from a respective one of the longitudinally extending frame members; and
       a transverse bracket frame member extending transversely from and connected to each of the first frame members, the transverse bracket frame member including,
          hood mounting structures configured to mount a vehicle hood, and
          headlight mount structure configured to mount a headlight assembly,
    a bumper assembly connected to each of the first frame members;
    a pair of suspension members movably mounted on a respective one of the first frame members;

a left damper connected to and extending between the transverse bracket frame member and a left one of the suspension members;

a right damper connected to and extending between the transverse bracket frame member and a right one of the suspension members;

a radiator having a bottom end and a top end, the bottom end is connected to the bumper assembly and each of the first frame members; and a radiator mount structure extending from and connected to each of the top end of the radiator and the transverse bracket frame member.

16. The frame assembly for a vehicle according to claim 15, further comprising:

a headlight assembly mounted on the headlight mount structure of the transverse bracket member.

17. The frame assembly for a vehicle according to claim 15, wherein the hood mounting structures include a stopper cushion mounted on the transverse bracket member; and a hood assembly and an engagement member protruding from the bottom surface of the hood assembly toward and engaging the cushion stopper.

18. The frame assembly according to claim 15, further comprising a right headlight mount and a left headlight mount, and the right headlight mount is located at a right terminal end of the transverse bracket member and the left headlight mount is located at a left terminal end of the transverse bracket member, such that the radiator mount, hood mounts, left damper mount, and right damper mount are located between the left headlight mount and the right headlight mount.

19. The frame assembly according to claim 18, wherein the transverse bracket member includes a top surface, a front surface, and a rear surface, and the front surfaces and rear surface extend in a parallel fashion with respect to each other, and the right damper is connected to the transverse bracket member via a pivot structure that extends from the front surface to the rear surface of the transverse bracket member, and the left damper is connected to the transverse bracket member via a left pivot structure that extends from the front surface to the rear surface of the transverse bracket member.

20. A vehicle including a frame assembly for the vehicle, comprising:

a passenger main frame assembly configured to protect a passenger compartment of the vehicle;

a rear frame assembly connected to a rear portion of the passenger main frame assembly;

a front frame assembly connected to a front portion of the passenger main frame assembly, the front frame assembly including, a pair of longitudinally extending frame members, a pair of first frame members extending upwardly from a respective one of the longitudinally extending frame members, and a transverse bracket frame member extending transversely from and connected to each of the first frame members, a pair of suspension members movably mounted on the front frame assembly;

a left damper connected to and extending between the transverse bracket frame member and a left one of the suspension members;

a right damper connected to and extending between the transverse bracket frame member and a right one of the suspension members;

a hood mount structure located on the transverse bracket frame;

a headlight mount structure located on the transverse bracket frame; and a radiator mount structure located on the transverse bracket frame member.

* * * * *